US011363206B2

(12) United States Patent
Wang et al.

(10) Patent No.: US 11,363,206 B2
(45) Date of Patent: Jun. 14, 2022

(54) METHOD FOR CORRECTING ROLLING SHUTTER PHENOMENON, ROLLING SHUTTER PHENOMENON CORRECTING APPARATUS, AND COMPUTER-READABLE RECORDING MEDIUM

(71) Applicants: Yiwei Wang, Beijing (CN); Liyan Liu, Beijing (CN); Wei Wang, Beijing (CN)

(72) Inventors: Yiwei Wang, Beijing (CN); Liyan Liu, Beijing (CN); Wei Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/932,013

(22) Filed: Jul. 17, 2020

(65) Prior Publication Data
US 2021/0029283 A1  Jan. 28, 2021

(30) Foreign Application Priority Data

Jul. 24, 2019  (CN) .......................... 201910671812.1

(51) Int. Cl.
*H04N 5/232* (2006.01)
*H04N 5/353* (2011.01)

(52) U.S. Cl.
CPC ....... *H04N 5/2329* (2013.01); *H04N 5/23254* (2013.01); *H04N 5/23258* (2013.01); *H04N 5/353* (2013.01); *H04N 5/3532* (2013.01); *H04N 5/3535* (2013.01)

(58) Field of Classification Search
CPC .... H04N 5/3532; H04N 5/2329; H04N 5/353; H04N 5/3535
See application file for complete search history.

(56) References Cited

U.S. PATENT DOCUMENTS

| 8,937,643 | B1* | 1/2015 | Esteban ..................... G06T 5/50 |
| | | | 348/46 |
| 9,135,715 | B1* | 9/2015 | Klingner ..................... G06T 7/20 |
| 9,204,041 | B1 | 12/2015 | Campbell |
| 10,482,571 | B2 | 11/2019 | Yi et al. |
| 10,482,644 | B2 | 11/2019 | Li et al. |
| 10,681,277 | B1* | 6/2020 | Kulik .................... H04N 5/3532 |
| 10,682,137 | B2* | 6/2020 | Stokes ............. A61B 17/07207 |
| 2008/0069553 | A1* | 3/2008 | Li ......................... H04N 5/3532 |
| | | | 396/125 |
| 2009/0185799 | A1* | 7/2009 | Kawarada ............ H04N 5/3532 |
| | | | 396/125 |
| 2009/0201361 | A1 | 8/2009 | Lyon et al. |

(Continued)

OTHER PUBLICATIONS

Extended European Search Report dated Oct. 21, 2020 issued in corresponding European Appln. No. 20186659.7.

*Primary Examiner* — David N Werner
(74) *Attorney, Agent, or Firm* — Harness, Dickey & Pierce, P.L.C.

(57) ABSTRACT

A method, for correcting a rolling shutter phenomenon, includes obtaining a double fish-eye image to be processed using a photographing device; obtaining an image processing parameter including gyro data of the photographing device; calculating a rolling shutter phenomenon correcting parameter based on the image processing parameter; and correcting the rolling shutter phenomenon with respect to the double fish-eye image in a spherical-coordinate system using the rolling shutter phenomenon correcting parameter.

20 Claims, 11 Drawing Sheets

(56) References Cited

U.S. PATENT DOCUMENTS

| | | | | |
|---|---|---|---|---|
| 2011/0115956 A1* | 5/2011 | Yanai | G03B 7/00 | 348/302 |
| 2012/0120291 A1* | 5/2012 | Shiohara | H04N 5/353 | 348/296 |
| 2012/0242847 A1* | 9/2012 | Narita | H04N 5/3532 | 348/208.1 |
| 2013/0335606 A1* | 12/2013 | Aoki | H04N 5/2329 | 348/296 |
| 2014/0078327 A1* | 3/2014 | Miyasako | H04N 5/23258 | 348/208.6 |
| 2014/0152793 A1* | 6/2014 | Staker | H04N 5/378 | 348/79 |
| 2014/0198184 A1* | 7/2014 | Stein | H04N 5/232 | 348/47 |
| 2015/0062013 A1* | 3/2015 | Solomon | H04N 5/2353 | 345/158 |
| 2015/0062357 A1* | 3/2015 | Ryu | H04N 5/374 | 348/208.1 |
| 2016/0072999 A1* | 3/2016 | Miyasako | H04N 5/772 | 348/208.6 |
| 2016/0180137 A1* | 6/2016 | McCloskey | G06K 7/1473 | 235/462.29 |
| 2017/0289476 A1* | 10/2017 | Kokubu | H04N 5/232 | |
| 2018/0302543 A1* | 10/2018 | Somasundaram | H04N 5/2356 | |
| 2018/0316865 A1* | 11/2018 | Wakamatsu | H04N 5/23258 | |
| 2018/0332206 A1 | 11/2018 | Meier | | |
| 2018/0359418 A1 | 12/2018 | Wang et al. | | |
| 2018/0359419 A1* | 12/2018 | Hu | G03B 15/006 | |
| 2018/0364451 A1* | 12/2018 | Sumihiro | H04N 5/232 | |
| 2019/0052788 A1* | 2/2019 | Liu | H04N 5/23258 | |
| 2019/0098233 A1* | 3/2019 | Gassend | H04N 5/2353 | |
| 2019/0182428 A1* | 6/2019 | Huang | H04N 5/23254 | |
| 2020/0099824 A1* | 3/2020 | Benemann | H04N 5/3532 | |
| 2020/0412954 A1* | 12/2020 | Gaizman | H04N 5/23254 | |

* cited by examiner

METHOD FOR CORRECTING ROLLING SHUTTER PHENOMENON, ROLLING SHUTTER PHENOMENON CORRECTING APPARATUS, AND COMPUTER-READABLE RECORDING MEDIUM

BACKGROUND OF THE INVENTION

1. Field of the Invention

The present invention relates to a field of image processing technology and, in particular, to a method for correcting rolling shutter phenomenon, a rolling shutter phenomenon correcting apparatus, and a computer-readable recording medium.

2. Description of the Related Art

With a rapid development of panoramic video processing technologies, there is an urgent need to provide a method for correcting a panoramic rolling shutter phenomenon. The method proposed in the related art needs to cut an image and cannot guarantee the integrity of the image.

SUMMARY OF THE INVENTION

A method for correcting a rolling shutter phenomenon includes obtaining a double fish-eye image to be processed using a photographing device; obtaining an image processing parameter including gyro data of the photographing device; calculating a rolling shutter phenomenon correcting parameter based on the image processing parameter; and correcting the rolling shutter phenomenon with respect to the double fish-eye image in a spherical-coordinate system using the rolling shutter phenomenon correcting parameter.

Other objects, features and advantages of the present invention will become more apparent from the following detailed description when read in conjunction with the accompanying drawings.

BRIEF DESCRIPTION OF THE DRAWINGS

In order to further clarify the technical proposals for embodiments of the present invention, the drawings used to describe the embodiments of the present invention will be briefly described below. Clearly, it will be obvious to those skilled in the art that the drawings set forth below are merely examples of the present invention, and other drawings obtained by these drawings are possible without any creative work.

DETAILED DESCRIPTION OF THE PREFERRED EMBODIMENTS

An embodiment of the present invention provides a method, an apparatus, and a computer-readable recording medium for correcting a rolling shutter phenomenon, and can eliminate a rolling shutter phenomenon in an image, under the assumption of assuring the integrity of the image.

In an embodiment of the present invention, a rolling shutter phenomenon correcting parameter is calculated with the use of an image processing parameter including gyro data of a photographing device, and rolling shutter phenomenon correction is performed by using the rolling shutter phenomenon correcting parameter for an obtained double fish-eye image. Because the method of the embodiment of the present invention does not require cutting of an image, the rolling shutter phenomenon in the image can be eliminated under the assumption of assuring the integrity of the image in comparison to the related art.

Although the drawings of the embodiments of the present disclosure will now be combined to explicitly and completely describe the technical proposals for the embodiments of the present disclosure, it will be appreciated that the embodiments described are only part of the embodiments of the present disclosure and not all of the embodiments. All other embodiments obtained by a person skilled in the art without creative work in accordance with the embodiments of the present disclosure fall within the scope of protection of the present disclosure.

By an "embodiment" referred to herein, it is meant that certain features, structures, or characteristics associated with the embodiment are included in at least one embodiment of the invention. Accordingly, the term "embodiment" which appears throughout this specification does not necessarily refer to the same embodiment. These particular features, structures, or characteristics may optionally be combined in one or more embodiments in a suitable manner.

In the various embodiments of the present invention, the number of each step below does not mean an actual order of execution. The order in which each step is performed depends on its function and intrinsic logic and does not limit in any way the process of implementing the embodiments of the present invention.

Figure 1:
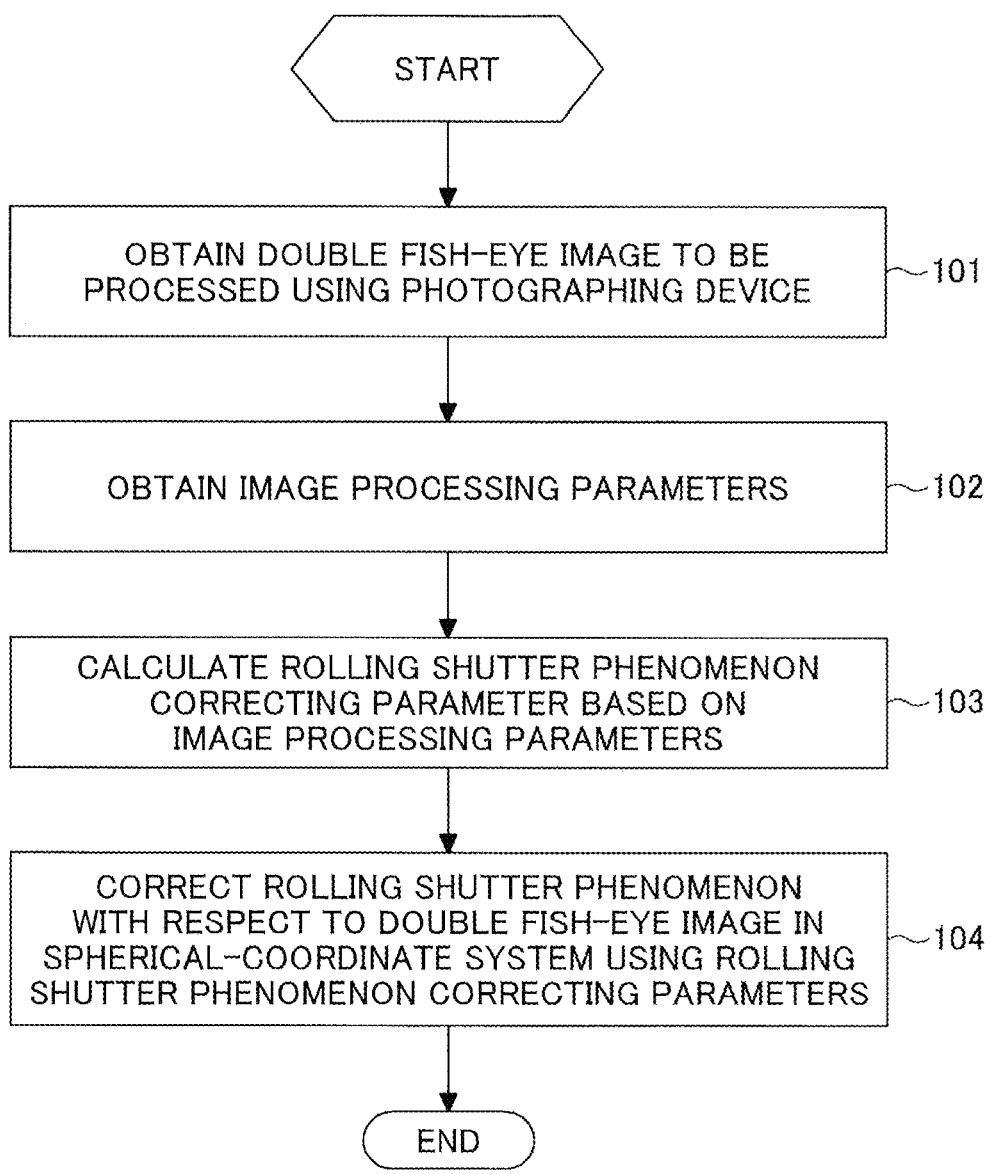
FIG. 1 depicts a flow diagram of a method for correcting a rolling shutter phenomenon according to an embodiment of the present invention.

FIG. 1 is a flow diagram of a rolling shutter phenomenon correcting method according to the embodiment of the present invention, including the following steps, as depicted in FIG. 1:

Step 101 is a step of obtaining a double fish-eye image to be processed using a photographing device.

The photographing device may be a camera, an imaging head, or the like.

Step 102 is to obtain image processing parameters.

The image processing parameters include gyro data of the photographing device. The gyro data may include a time stamp, and the photographing device is at angular velocities on three axes of X, Y, and Z.

In order to obtain a satisfactory correcting effect, in the embodiment of the present invention, the image processing parameters further include the following:

A time stamp of each frame image produced by the photographing device, a rolling shutter phenomenon time of the photographing device, a width and a height of a single fish-eye image, and an aperture value of the photographing device.

In the embodiment of the present invention, the rolling shutter phenomenon time of the photographing device can be, for example, 25.6 ms. In an example where the camera is the photographing device, the aperture value can be set to 200°.

Step 103 is a step of calculating rolling shutter phenomenon correcting parameters based on the image processing parameters.

Figure 2:
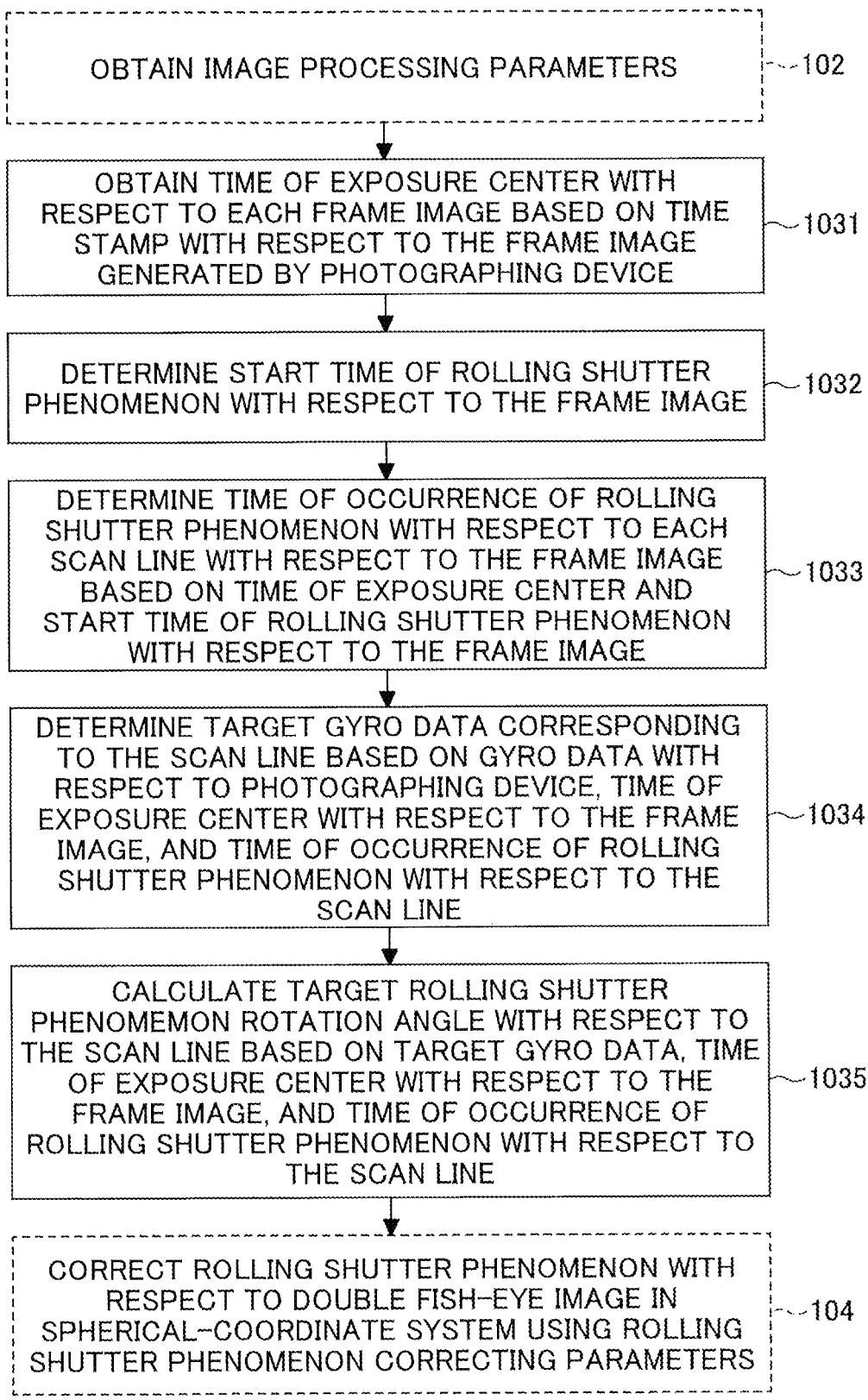
FIG. 2 depicts a process of step 103 of the embodiment of the invention.

In the embodiment of the present invention, a main indicator of the rolling shutter phenomenon correcting parameter is a rolling shutter phenomenon rotation angle. In this step, as depicted in FIG. 2, the rolling shutter phenomenon correcting parameters7 can be calculated by the following formulas.

Step 1031 is a step of obtaining the time at the exposure center (the time at midpoint of exposure) with respect to each frame image based on the time stamp of the frame image generated by the photographing device.

In the embodiment of the present invention, the time stamp of each frame image obtained can be the time at the exposure center with respect to the frame image.

Step 1032 is a step of determining the start time of the rolling shutter phenomenon with respect to the frame image.

In this step, the start time of the rolling shutter phenomenon with respect to the frame image is determined by the following equation (1).

$$RST_{start} = ECT - rst/2 \quad (1)$$

In the equation, $RST_{start}$ denotes the start time of the rolling shutter phenomenon with respect to the frame image, ECT denotes the time at the exposure center with respect to the frame image, and rst denotes the rolling shutter phenomenon time with respect to the photographing device.

Step 1033 is a step of determining the time of occurrence of the rolling shutter phenomenon with respect to each scan line with respect to each frame image based on the time at the exposure center with respect to the frame image and the start time of the rolling shutter phenomenon.

In this step, the occurrence time of the rolling shutter phenomenon with respect to each scan line with respect to the frame image is determined by the following equation (2).

$$rst_{row\_i} = RST_{start} + rst \times \frac{row\_i}{h} \quad (2)$$

In the equation, $rst_{row\_i}$ denotes the time of occurrence of the rolling shutter phenomenon with respect to each scan line with respect to the frame image, $RST_{start}$ denotes the start time of the rolling shutter phenomenon with respect to the frame image, rst denotes the rolling shutter phenomenon time with respect to the photographing device, row_i denotes the i-th scan line of the frame image, and h denotes the total number of scan lines of the frame image.

Step 1034 is a step of determining target gyro data corresponding to the scan line based on the gyro data of the photographing device, the time at the exposure center with respect to the frame image, and the time of occurrence of the rolling shutter phenomenon with respect to the scan line.

In this step, one or more sets of gyro data may be obtained. The gyro data obtained within the corresponding period from the time at the exposure center with respect to each frame image to the time of occurrence of the rolling shutter phenomenon with respect to the scan line can be referred to as target gyro data. Thus, each scan line can correspond to one or more sets of gyro data.

Step 1035 is a step of calculating a target rolling shutter phenomenon rotation angle of the scan line based on the target gyro data, the time at the exposure center with respect to the frame image, and the time of occurrence of the rolling shutter phenomenon with respect to the scan line.

In this step, the target period is sectioned into at least two subperiods using the target gyro data. The length of the target period is determined by the time of occurrence of the rolling shutter phenomenon with respect to each scan line with respect to the frame image and the time at the exposure center with respect to the frame image. Thereafter, the lengths of the times of the at least two subperiods and the sets of first gyro data corresponding to the at least two subperiods are respectively multiplied to obtain at least two products. The first gyro data is data included in the target gyro data or reference gyro data. Thereafter, the products obtained are added to obtain a target rolling shutter phenomenon rotation angle with respect to the scan line.

Figure 3:
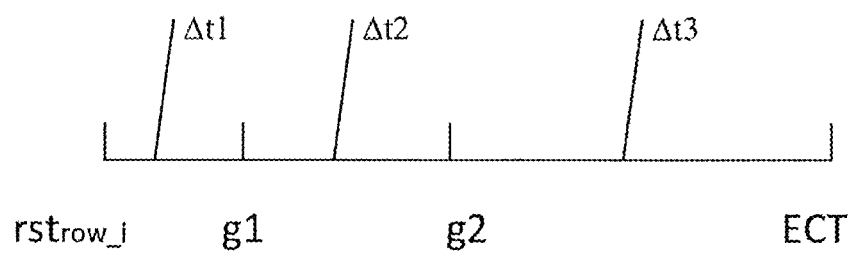
FIG. 3 depicts a process for calculating a target rolling shutter phenomenon rotation angle with respect to each scan line according to the embodiment of the present invention.

As depicted in FIG. 3, it is assumed that there are two sets of gyro data, g1 and g2 in the time t between $rst_{row\_i}$ and ECT. The time of g1 is before the time of g2. Then g1 and g2 are used to section the time t into three subperiods. Those subperiods are: $rst_{row\_i}$ through t1; t1 through t2; and t2 through ECT. The lengths of these three subperiods are $\Delta t1$, $\Delta t2$, and $\Delta t3$, respectively.

Then, the target rolling shutter phenomenon rotation angle is calculated by the following equation (3):

$$G = \Delta t1 \times g0 + \Delta t2 \times g1 + \Delta t3 \times g2 \quad (3)$$

Alternatively, it is also possible to calculate the target rolling shutter phenomenon rotation angle by the following equation (4):

$$G = \Delta t1 \times g1 + \Delta t2 \times g2 + \Delta t3 \times g3 \quad (4)$$

In the equations, g0 and g3 denote reference gyro data. For example, g0 may be the gyro data within a period before the period t, and g3 may be the gyro data within a period after the period t.

On the basis of the above-described data, in this step, it is also possible to obtain a correcting reference parameter after obtaining the target rolling shutter phenomenon rotation angle in order to further accurately obtain the target rolling shutter phenomenon rotation angle. The correcting reference parameter includes information of the lens to be corrected and a correcting direction. In this regard, information of a photographing head to be corrected may include information of a front photographing head and information of a rear photographing head; and the correcting direction may be a pitch, roll, yaw, or the like. Thereafter, a final target rolling shutter phenomenon rotation angle corresponding to the target rolling shutter phenomenon rotation angle is determined based on correspondence relationships between the information of the lens to be corrected; the correcting direction; and the angle.

Table 1 shows the correspondence relationships between the information of the lens to be corrected; the correcting direction; and the angle.

TABLE 1

| | front photographing head | rear photographing head |
|---|---|---|
| pitch | Angle | Angle |
| roll | Angle | −Angle |
| yaw | −Angle | Angle |

Based on Table 1 above, the calculated target rolling shutter phenomenon rotation angle is expressed as Angle. In a case where the lens to be corrected is a front photographing head and the correcting direction is pitch, the final target rolling shutter phenomenon rotation angle is Angle; and in a case where the lens to be corrected is the front photographing head and the correcting direction is yaw, the final target rolling shutter phenomenon rotation angle is −Angle.

Step 104 is a step of correcting the rolling shutter phenomenon with respect to the double fish-eye image in a spherical-coordinate system using the rolling shutter phenomenon correcting parameters.

Figure 4:
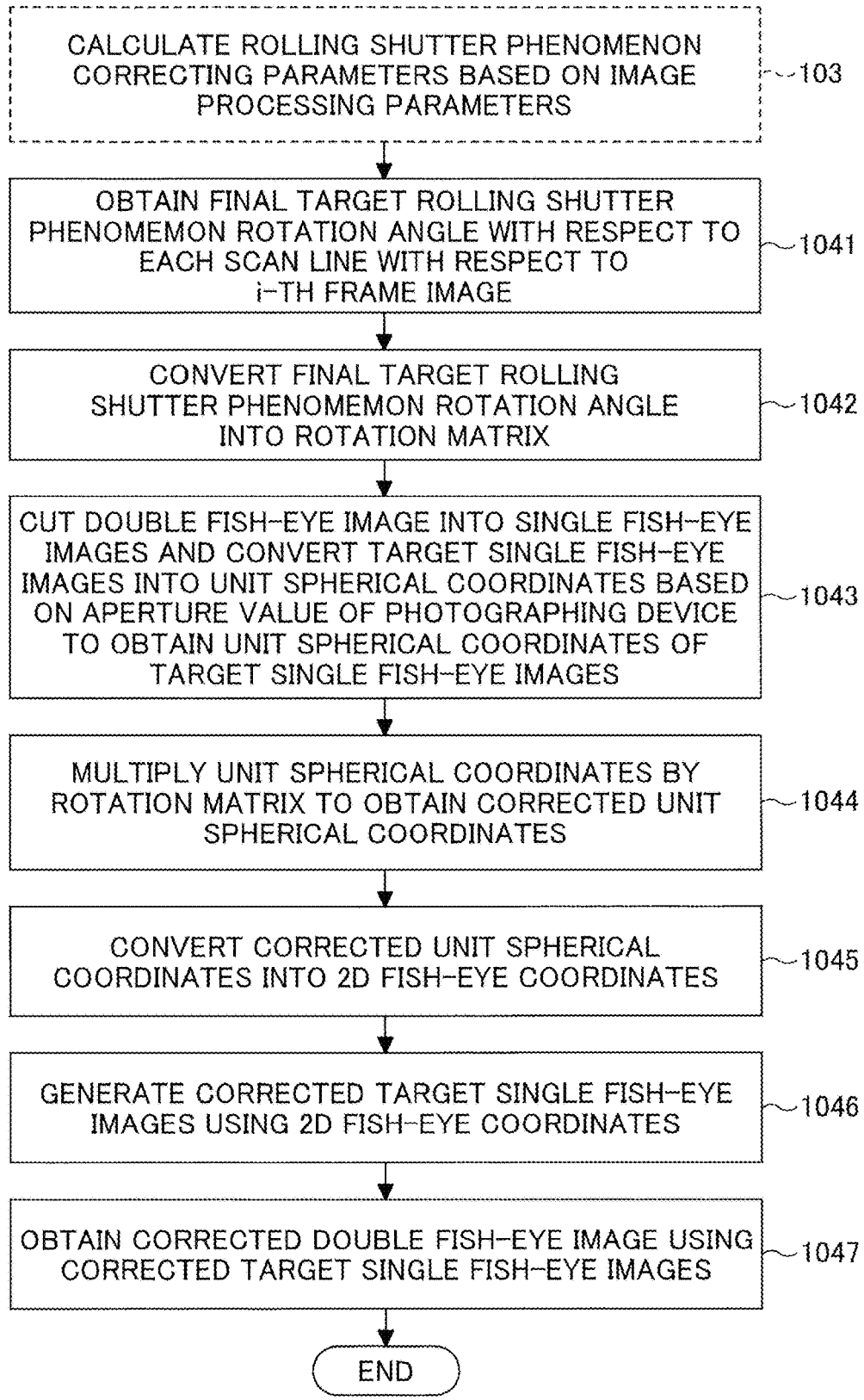
FIG. 4 depicts a process of step 104 according to the embodiment of the invention.

In the embodiment of the present invention, the main idea of rolling shutter phenomenon correction is to convert fish-eye image coordinates into three-dimensional coordinates and then correct a distortion by performing rotation in a three-dimensional space, that is, to correct a rolling shutter phenomenon in a spherical-coordinate system. Specifically, in this step, as depicted in FIG. 4, the correction can be implemented by the following method:

Step 1041 is a step of obtaining a final target rolling shutter phenomenon rotation angle with respect to each scan line with respect to the i-th frame image.

Based on the calculation of step 103, the final target rolling shutter phenomenon rotation angle with respect to each scan line with respect to the i-th frame image can be obtained.

Step 1042 is a step of converting the final target rolling shutter phenomenon rotation angle to a rotation matrix.

Step 1043 is a step of cutting the double fish-eye image into single fish-eye images, and converting target single fish-eye images into unit spherical coordinates based on the aperture value of the photographing device to obtain unit spherical coordinates of the target single fish-eye images, which are single frames of the single fish-eye images.

Step 1044 is a step of multiplying the unit spherical coordinates by a rotation matrix to obtain corrected unit spherical coordinates.

Step 1045 is a step of converting the corrected unit spherical coordinates to 2D fish-eye coordinates.

Step 1046 is a step of generating corrected target single fish-eye images using the 2D fish-eye coordinates.

Step 1047 is a step of obtaining a corrected double fish-eye image using the corrected target single fish-eye images.

In addition, on the basis of the above-described embodiment, in a case where the unit spherical coordinates do not fit the photographing device, the unit spherical coordinates may be rotated by a first angle along a first coordinate axis after step 1043 to obtain first unit spherical coordinates. For example, the unit spherical coordinates can be rotated 90 degrees along the Y-axis. In step 1044, specifically, the first unit spherical coordinates are multiplied by the rotation matrix to obtain corrected first unit spherical coordinates. Correspondingly, after obtaining the corrected first unit spherical coordinates, the corrected first unit spherical coordinates are rotated in the reverse direction by the first angle along the first coordinate axis. In the example, the unit spherical coordinates can be rotated in the reverse direction by 90 degrees along the Y-axis. In step 1045, specifically, the corrected first unit spherical coordinates after the rotation in the reverse direction are converted to 2D fish-eye coordinates.

In the example where the unit spherical coordinates are rotated by 90 degrees along the Y axis, the unit spherical coordinates can be rotated by the first angle along the first coordinate axis to obtain the first unit spherical coordinates by the following equation:

$$coor_{3drotated} = \begin{bmatrix} 0 & 0 & 1 \\ 0 & 1 & 0 \\ -1 & 0 & 0 \end{bmatrix} \cdot coor_{3d}$$

In the equation, $coor_{3drotated}$ denotes the first unit spherical coordinates, and $coor_{3d}$ denotes the unit spherical coordinates.

Then, the first unit spherical coordinates and the rotation matrix are multiplied by the following equation to obtain the corrected first unit spherical coordinates:

$$coor_{3dRSC} = R \cdot coor_{3drotated}$$

In the equation, $coor_{3dRSC}$ denotes the corrected first spherical coordinates, R denotes the rotation matrix, and $coor_{3drotated}$ denotes the unit spherical coordinates.

Specifically, the corrected first unit spherical coordinates are rotated in the reverse direction by the first angle along the first coordinate axis by the following equation:

$$coor_{3dRSCrotated} = \begin{bmatrix} px_{rs} \\ py_{rs} \\ pz_{rs} \end{bmatrix} = \begin{bmatrix} 0 & 0 & -1 \\ 0 & 1 & 0 \\ 1 & 0 & 0 \end{bmatrix} \cdot coor_{3dRSC}$$

In the equation, $coor_{3dRSCrotated}$ denotes the corrected first unit spherical coordinates after being rotated in the reverse direction, and $coor_{3dRSC}$ denotes the corrected first unit spherical coordinates.

Figure 5:
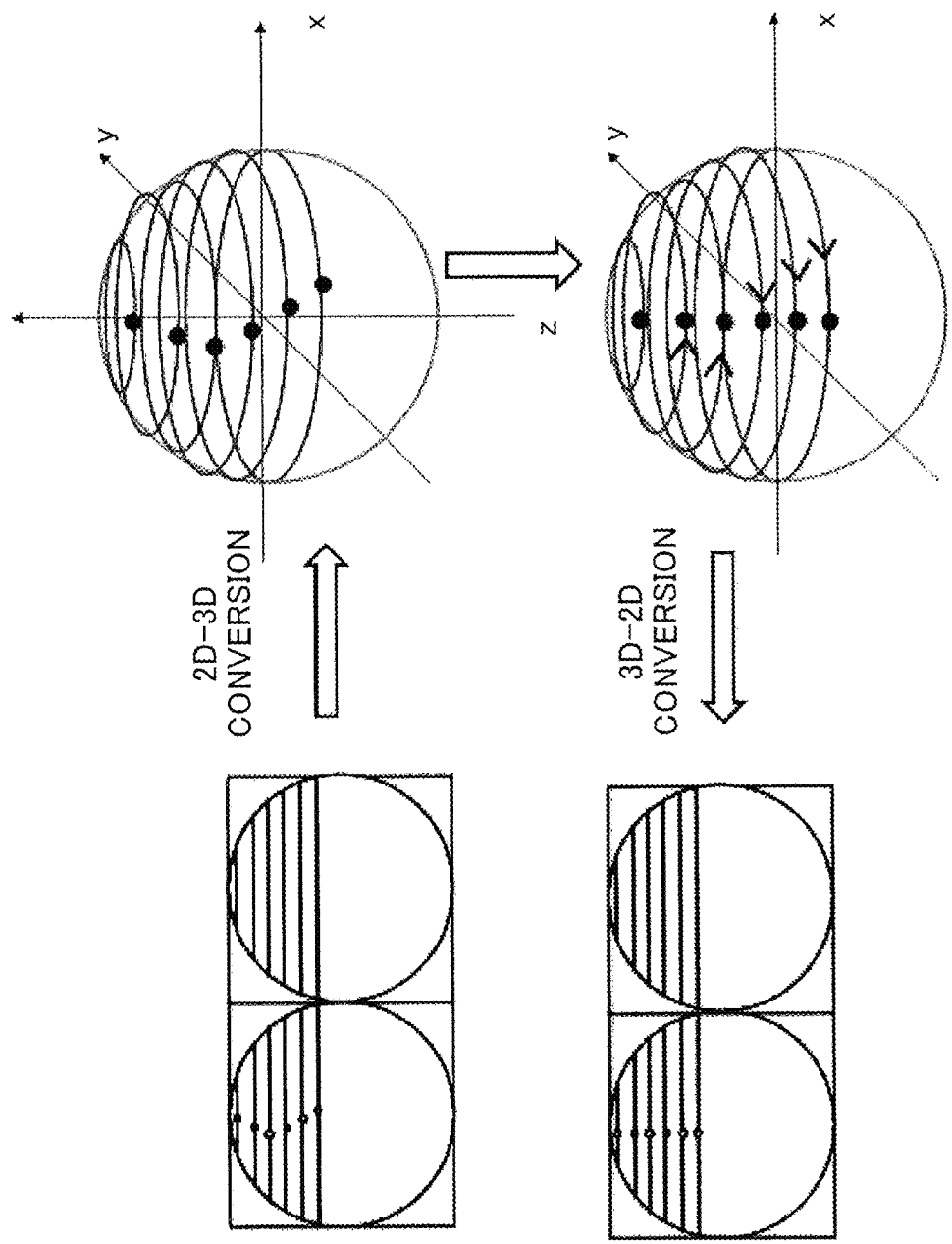
FIG. 5 depicts a process for correcting a rolling shutter phenomenon according to the embodiment of the present invention.

FIG. 5 shows an example of rolling shutter phenomenon correction. With reference to FIG. 5, in a two-dimensional fish-eye image, points need to be on a straight line, however, due to a presence of a rolling shutter phenomenon, the points are on a curve, as depicted in FIG. 5. According to the rolling shutter phenomenon correcting method, the two-dimensional fish-eye image is converted into a three-dimensional unit sphere image, then the three-dimensional unit sphere image is rotated to align these points, and then, the three-dimensional unit sphere image thus processed is converted to be returned to a two-dimensional fish-eye image.

In the embodiment of the present invention, the rolling shutter phenomenon correcting parameters are calculated by the use of the image processing parameters including the gyro data of the photographing device, and the rolling shutter phenomenon correction is performed by using the rolling shutter phenomenon correcting parameters on the obtained double fish-eye image. Because the method according to the embodiment of the present invention does not require cutting of an image, the rolling shutter phenomenon in the image can be eliminated under the assumption of assuring the integrity of the image in comparison to the related art.

In addition, because, according to the embodiment of the present invention, a two-dimensional image is converted into a three-dimensional unit sphere image, it is not necessary to correct the rolling shutter phenomenon using the intrinsic parameters, in comparison to the calculation method of the related art. Because a three-dimensional unit sphere image is rotated, the method of the embodiment of the present invention can be used to ultimately generate a complete two-dimensional image, in comparison to the warping calculation method in the related art.

In an experiment, rolling shutter phenomenon correction rates were calculated for a large number of images in different directions and different resolutions, the rates were all greater than zero. Accordingly, it can be seen that the rolling shutter phenomenon correction can be implemented very satisfactorily according to the method of the embodiment of the present invention.

Figure 6:
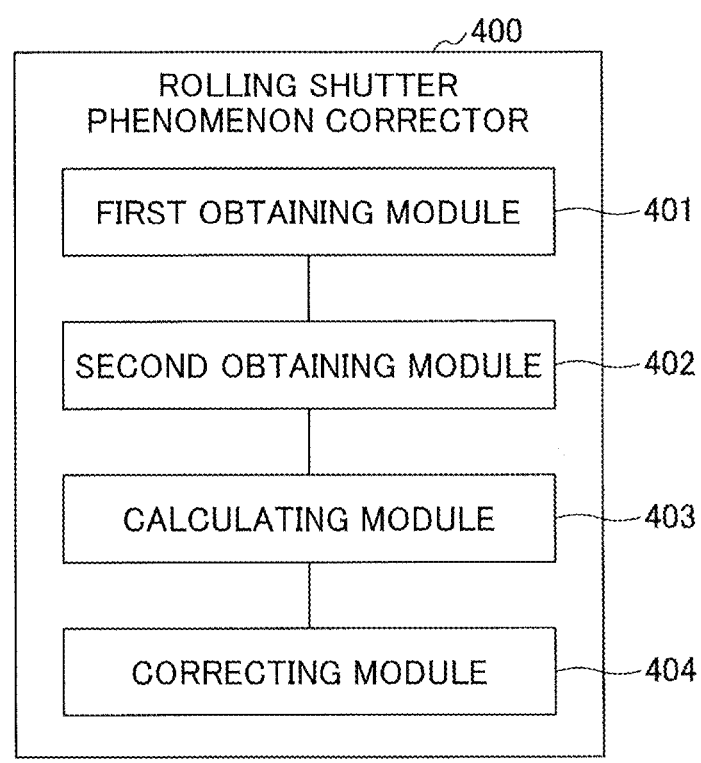
FIG. 6 is a structural diagram of a rolling shutter phenomenon corrector according to the embodiment of the present invention.

FIG. 6 is a structural diagram of a rolling shutter phenomenon correcting apparatus according to an embodiment of the present invention. As depicted in FIG. 6, the rolling shutter phenomenon correcting apparatus 400 includes a first obtaining module 401 used to obtain a double fish-eye image to be processed using a photographing device, a second obtaining module 402 used to obtain image processing parameters including gyro data of the photographing device, a calculating module 403 used to calculate rolling shutter phenomenon correcting parameters based on the image processing parameters, and a correcting module 404 used to correct the rolling shutter phenomenon with respect to the double fish-eye image in a spherical-coordinate system using the rolling shutter phenomenon correcting parameters.

Optionally, in the embodiment of the present invention, the image processing parameters include a time stamp of each frame image produced by the photographing device, a rolling shutter phenomenon time of the photographing device, a width and a height of a single fish-eye image, and an aperture value of the photographing device.

Figure 7:
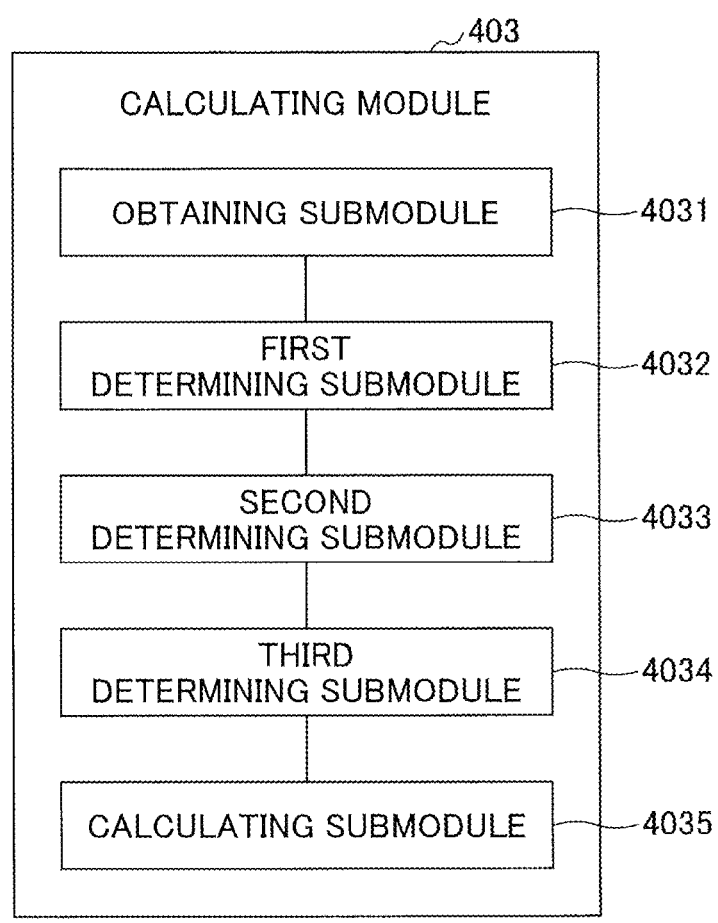
FIGS. 7-9 are structural diagrams of a calculating module in the rolling shutter phenomenon corrector according to the embodiment of the present invention.

Optionally, as depicted in FIG. 7, the calculating module 403 includes an obtaining submodule 4031, which obtains the time at the exposure center with respect to each frame image based on the time stamp of the frame image generated by the photographing device, a first determining submodule 4032 for determining the start time of the rolling shutter phenomenon with respect to the frame image, a second determining submodule 4033 for determining the time of occurrence of the rolling shutter phenomenon with respect to each scan line with respect to the frame image based on the time at the exposure center and the start time of the rolling shutter phenomenon with respect to the frame image, a third determining submodule 4034 for determining target gyro data corresponding the scan line based on the gyro data of the scanning device, the time of the exposure center with respect to the frame image, and the time of occurrence of the rolling shutter phenomenon with respect to the scan line, a calculating submodule 4035 for calculating a target rolling shutter phenomenon rotation angle with respect to the scan line based on the target gyro data, the time at the exposure center time with respect to the frame image, and the time of occurrence of the rolling shutter phenomenon time with respect to the scan line.

Optionally, the first determining submodule 4032 is used to determine the start time of the rolling shutter phenomenon with respect to the frame image by, specifically, the following equation:

$$RST_{start} = ECT - rst/2$$

In the equation, $RST_{start}$ denotes the start time of the rolling shutter phenomenon with respect to the frame image, ECT denotes the time at the exposure center with respect to the frame image, and rst denotes the rolling shutter phenomenon time of the photographing device occurs.

Optionally, the second determining submodule 4033 is used to determine the time of occurrence of the rolling shutter phenomenon with respect to each scan line of the frame image by, specifically, the following equation:

$$rst_{row\_i} = RST_{start} + rst \times \frac{row\_i}{h}$$

In the equation, $rst_{row\_i}$ denotes the time of occurrence of the rolling shutter phenomenon with respect to each scan line with respect to the frame image, $RST_{start}$ denotes the start time of the rolling shutter phenomenon with respect to the frame image, rst denotes the rolling shutter phenomenon time with respect to the photographing device, row_i denotes the i-th scan line with respect to the frame image, and h denotes the total number of scan lines of the frame image.

Figure 8:
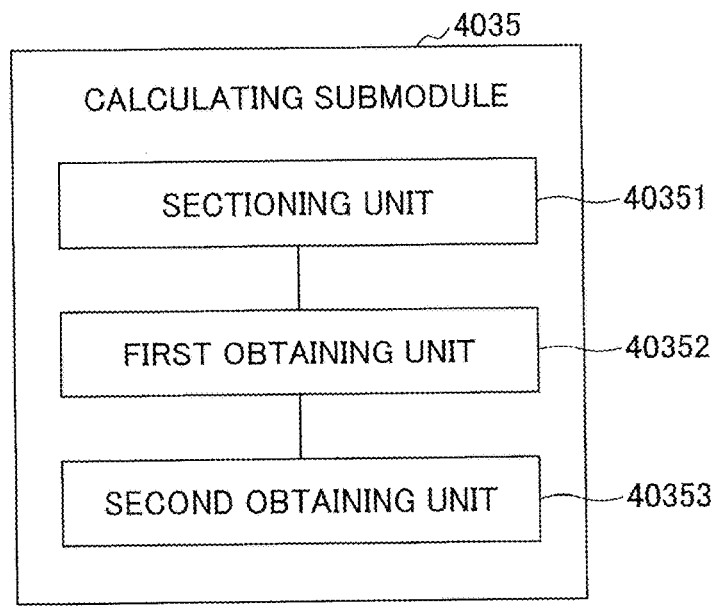

Optionally, as illustrated in FIG. 8, the calculating submodule 4035 may include a sectioning unit 40351 used to section a target period into at least two subperiods using the target gyro data, wherein the length of the target period is determined by the time of occurrence of the rolling shutter phenomenon with respect to each scan line with respect to the frame image and the time at the exposure center with respect to the frame image; a first obtaining unit 40352 used to multiply the lengths of the times of the at least two subperiods and first gyro data corresponding to the at least two subperiods, respectively, to obtain at least two products, the first gyro data being data included in the target gyro data or reference gyro data; and a second obtaining unit 40353 used to add the products obtained to obtain a target rolling shutter phenomenon rotation angle with respect to the scan line.

Figure 9:
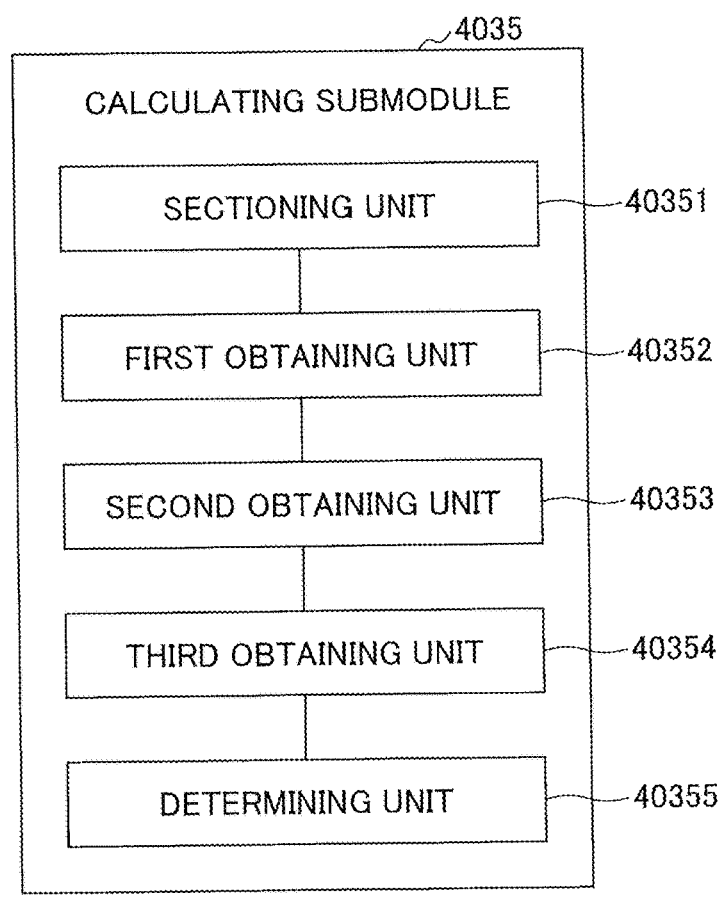

Optionally, as depicted in FIG. 9, the calculating submodule 4035 may include a third obtaining unit 40354 used to obtain correcting reference parameters including information of the lens to be corrected and a correcting direction, and a determination unit 40355 used to determine a final target rolling shutter phenomenon rotation angle corresponding to the target rolling shutter phenomenon rotation angle based on correspondence relationships between the information of the lens to be corrected; the correcting direction; and the angle.

Figure 10:
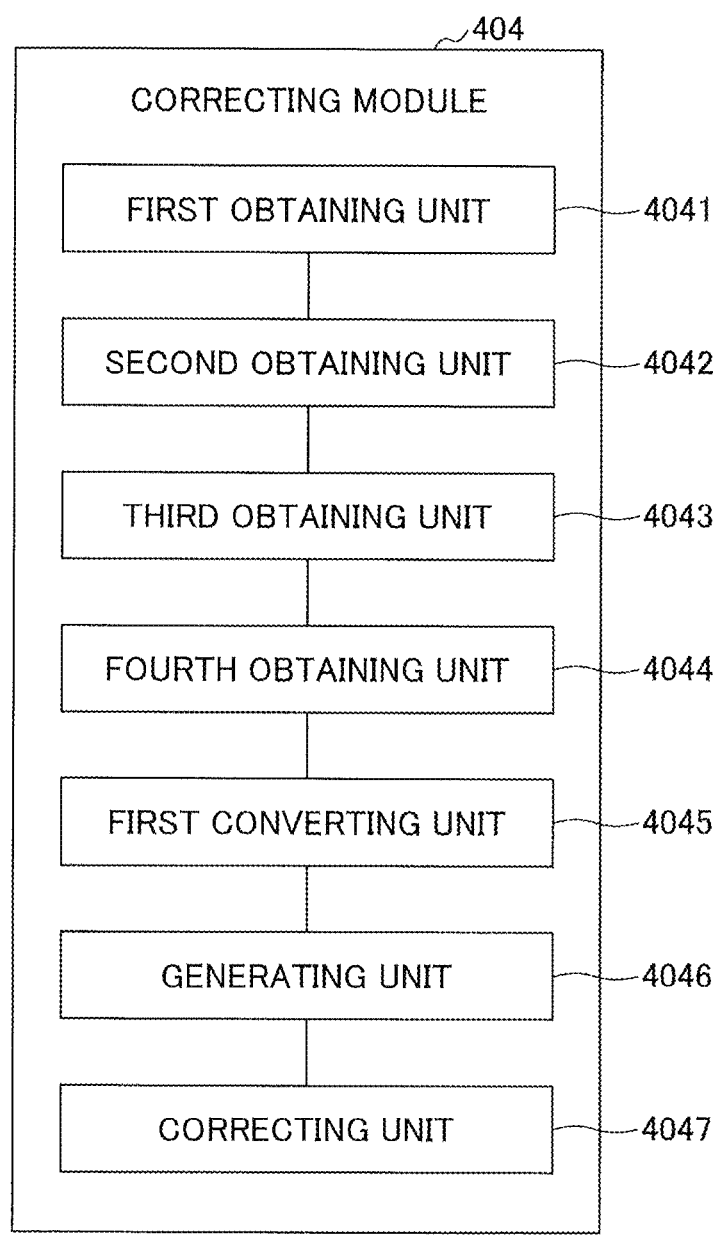
FIGS. 10 and 11 are structural diagrams of a correcting module in the rolling shutter phenomenon corrector according to the embodiment of the present invention.

Optionally, as depicted in FIG. 10, the correcting module 404 may include a first obtaining unit 4041 used to obtain a final target rolling shutter phenomenon rotation angle with respect to each scan line with respect to the i-th frame image; a second obtaining unit 4042 used to convert the final target rolling shutter phenomenon rotation angle into a rotation matrix; a third obtaining unit 4043 used to cut the double fish-eye image into single fish-eye images and convert target single fish-eye images into unit coordinates based on the aperture value of the photographing device to obtain unit coordinates of the target single fish-eye images, which are single frame images included in the single fish-eye images; a fourth obtaining unit 4044 used to multiply the unit spherical coordinates and the rotation matrix to obtain corrected unit spherical coordinates; a first converting unit 4045 used to convert the corrected unit spherical coordinates into 2D fish-eye coordinates; a generating unit 4046 used to generate corrected target single fish-eye images using the 2D fish-eye coordinates; and a correcting unit 4047 used to obtain a corrected double fish-eye image using the corrected single fish-eye images.

Figure 11:
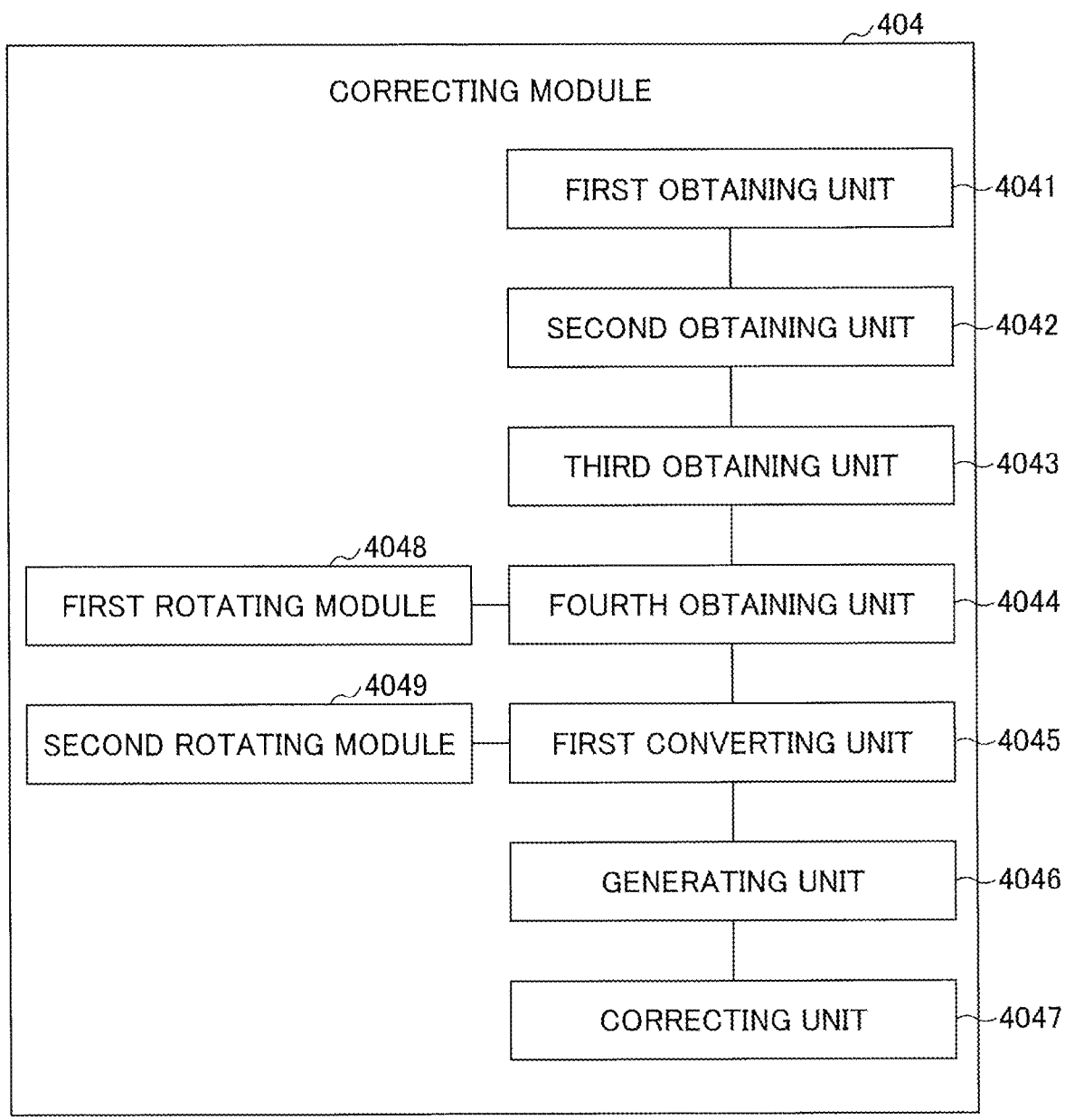

Optionally, as depicted in FIG. 11, the correcting module 404 may include a first rotating module 4048 used to rotate the unit spherical coordinates by a first angle along a first coordinate axis to obtain first unit spherical coordinates. At this time, the fourth obtaining unit 4044 is specifically used to multiply the first unit spherical coordinates by the rotation matrix to obtain corrected first unit spherical coordinates. The correcting module 404 may further include a second rotating module 4049 used to rotate in the reverse direction the corrected first unit spherical coordinates by the first angle along the first coordinate axis. At this time, the first converting unit 4045 is specifically used to convert the corrected first unit spherical coordinates, after being rotated in the reverse direction, to 2D fish-eye coordinates.

Because the apparatus according to the embodiment of the present invention is capable of implementing the embodiment of the above-described method, and the implementing principles and the technical effects are similar, further description of the embodiment of the apparatus is omitted.

Figure 12:
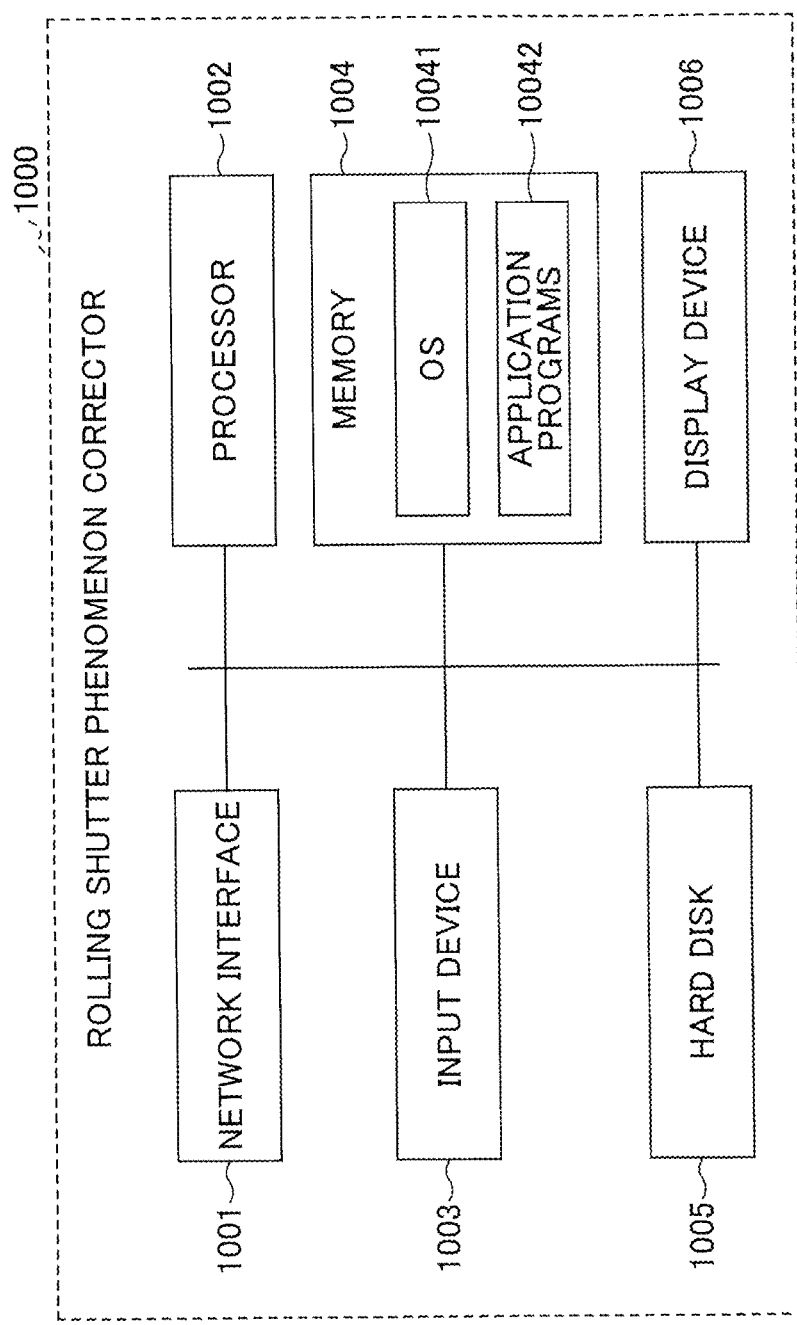
FIG. 12 is a hardware structure block diagram of the rolling shutter phenomenon corrector according to the embodiment of the present invention.

FIG. 12 is a hardware structure block diagram of the rolling shutter phenomenon correcting apparatus according to the embodiment of the present invention. As depicted in FIG. 12, the rolling shutter phenomenon correcting apparatus 1000 includes a processor 1002, and a memory 1004 in which computer program instructions are stored.

When the computer program instructions are executed by the processor 1002, the processor 1002 performs obtaining a double fish-eye image to be processed using a photographing device; obtaining an image processing parameter including gyro data of the photographing device; calculating a rolling shutter phenomenon correcting parameter based on the image processing parameter; correcting the rolling shutter phenomenon with respect to the double fish-eye image in a spherical-coordinate system using the rolling shutter phenomenon correcting parameter.

Further, as depicted in FIG. 12, the rolling shutter phenomenon correcting apparatus 1000 may include a network interface 1001, an input device 1003, a hard disk 1005, and a display device 1006.

The above-mentioned interface and devices are connected to each other by a bus architecture. The bus architecture may include any number of interconnecting buses and bridges. In more detail, one or more central processors (CPUs) as the processor 1002 and various circuits of one or more memories as the memory 1004 are connected together. The bus architecture may be also used to connect a variety of other circuitry, such as peripherals, voltage regulators, or power management circuitry. It is understood that the bus architecture is for implementing connection and communication between these elements. The bus architecture includes a power bus, a control bus, and a status signal bus as well as a data bus, all of which are known in the art and are not described in detail herein.

The network interface 1001 can be connected to a network (e.g., the Internet, a local area network, etc.), receive information from the network, and store the received contents in the hard disk 1005.

The input device 1003 can receive various instructions input by an operator and transmit the instructions to the processor 1002 for execution. The input device 1003 may include a keyboard or click device (e.g., a mouse, a trackball, a touchpad, a touch screen, etc.).

The display device 1006 may display the results obtained by executing the instructions by the processor 1002.

The memory 1004 is used to store data such as programs and data that are essential for the operating system to run, intermediate results during the processor 1002 operation process, and the like.

It will be appreciated that the memory 1004 of the embodiment of the present invention may be a volatile or non-volatile memory, and may include both volatile and non-volatile memories. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. The memory 1004 used in the apparatus and method described herein includes, but is not limited to, the above-mentioned memory and any other suitable type of memory.

In some embodiments, the memory 1004 stores various elements such as executable modules or data structures, their subsets or extended sets, an operating system 10041, and application programs 10042.

The operating system 10041 includes various system programs such as a framework layer, a core layer, a drive layer, and the like, to implement various basic tasks and hardware based tasks. The application programs 10042 include various application programs, such as a browser, to implement various application tasks. The program for implementing the method of the embodiment of the present invention may be included in the application programs 10042.

The method according to the above-described embodiment of the present invention can be applied to or implemented by the processor 1002. The processor 1002 may be an integrated circuit chip with signal processing capability. In the implementation process, each of the steps of the above method can be completed by integrated logic circuits of hardware of the processor 1002 or software commands. The processor 1002 may be a general purpose processor, a digital signal processor (DSP), an application specific integrated circuit (ASIC), a field configurable circuit array (FPGA), or other programmable logic devices, individual gates or transistor logic devices, or individual hardware units, and may implement or execute each method, step, and logic block diagram disclosed as the embodiment of the present invention. The general purpose processor may be a microprocessor or any known processor. A combination of the steps of the method of the embodiment of the present invention that can be implemented directly as a result of being executed and completed by a hardware decoder processor or executed and completed by a combination of hardware in a decoder processor and software modules. The software modules may be stored in a mature storage medium in the art such as a random memory, a flash memory, a read-only memory, a programmable read-only memory or an electrically erasable programmable memory, registers, or the like. The recording medium is in the memory 1004, and the processor 1002 reads information from the memory 1004 and combines the information with the hardware of the processor 1002 to complete the above method steps.

It is understandable that the embodiments described herein can be implemented in hardware, software, firmware, middleware, microcode, or combinations thereof. For hardware implementation, the process units may be implemented in one or more application-specific integrated circuits (ASICs), digital signal processors (DSPs), digital signal processing devices (DSPDs), programmable logic devices (PLDs), field programmable gate arrays (FPGAs), general-purpose processors, controllers, microcontrollers, microprocessors, other electronic modules for implementing the foregoing functions, or any combinations of these devices.

For software implementation, the techniques described herein can be implemented by modules (e.g., processes, functions, etc.) that perform the functions described herein. Software code is stored in the memory and can be executed by the processor. The memory can be implemented in or outside the processor.

The image processing parameters includes a time stamp of each frame image produced by the photographing device, a rolling shutter phenomenon time of the photographing device, a width and a height of a single fish-eye image, and an aperture value of the photographing device.

Specifically, when the computer program is executed by the processor 1002, obtaining the time at the exposure center with respect to each frame image based on the time stamp of the frame image generated by the photographing device; determining the start time of the rolling shutter phenomenon with respect to the frame image; determining the time of occurrence of the rolling shutter phenomenon with respect to each scan line with respect to the frame image based on the time at the exposure center and the start time of the rolling shutter phenomenon with respect to the frame image; determining target gyro data corresponding to the scan line based on gyro data of the photographing device, the time at the exposure center with respect to the frame image, and the time of occurrence of the rolling shutter phenomenon with respect to the scan line; calculating a target rolling shutter phenomenon rotation angle with respect to the scan line based on the target gyro data, the time at the exposure center with respect to the frame image, and the time of occurrence of the rolling shutter phenomenon with respect to the scan line can be implemented.

Specifically, when the computer program is executed by the processor 1002, the following equation also allows for the step of determining the start time of the rolling shutter phenomenon with respect to the frame image:

$$RST_{start} = ECT - rst/2$$

In the equation, $RST_{start}$ denotes the start time of the rolling shutter phenomenon with respect to the frame image, ECT denotes the time at the exposure center with respect to the frame image, and rst denotes the rolling shutter phenomenon time with respect to the photographing device.

Specifically, when the computer program is executed by the processor 1002, it is also possible to implement determining the time of occurrence of the rolling shutter phenomenon with respect to each scan line with respect to the frame image by the following equation:

$$rst_{row\_i} = RST_{start} + rst \times \frac{row\_i}{h}$$

In the equation, $rst_{row\_i}$ denotes the time of occurrence of the rolling shutter phenomenon with respect to each scan line with respect to the frame image, $RST_{start}$ denotes the start time of the rolling shutter phenomenon with respect to the frame image, row_i denotes the i-th scan line of the frame image, and h denotes the total number of scan lines of the frame image.

Specifically, when the computer program is executed by the processor 1002, using the target gyro data to section a target period into at least two subperiods, the length of the target period being determined by the time of occurrence of the rolling shutter occurrence with respect to each scan line with respect to the frame image and the time at the exposure center with respect to the frame image; multiplying the lengths of the times of the at least two subperiods by first gyro data corresponding to the at least two subperiods, respectively, to obtain at least two products, the first gyro data being data included in the target gyro data or reference gyro data; and adding the products to obtain a target rolling shutter phenomenon rotation angle with respect to the scan line can be implemented.

Specifically, when the computer program is executed by the processor 1002, obtaining a correcting reference parameter including information of the lens to be corrected and a correcting direction; determining a final target rolling shutter phenomenon rotation angle corresponding to the target rolling shutter phenomenon rotation angle based on correspondence relationships between the information of the lens to be corrected; the correcting direction; and the angle can be implemented.

Specifically, when the computer program is executed by the processor 1002, obtaining a final target rolling shutter phenomenon rotation angle with respect to each scan line with respect to the i-th frame image; converting the final target rolling shutter phenomenon rotation angle into a rotation matrix; cutting the double fish-eye image into single fish-eye images and converting target single fish-eye images into unit spherical coordinates based on the aperture value of the photographing device to obtain unit coordinates of the target single fish-eye images, which are single frame images included in the single fish-eye images; multiplying the unit spherical coordinates by the rotation matrix to obtain corrected unit spherical coordinates; converting the corrected unit spherical coordinates to 2D fish-eye coordinates; and using the 2D fish-eye coordinates to generate corrected target single fish-eye images; obtaining a corrected double fish-eye image by using the corrected single fish-eye images can also be implemented.

Specifically, when the computer program is executed by the processor 1002, rotating the unit spherical coordinates by a first angle along a first coordinate axis to obtain first unit spherical coordinates; multiplying the first unit spherical coordinates by the rotation matrix to obtain corrected first unit spherical coordinates; rotating in the reverse direction the corrected first unit spherical coordinates by the first angle along the first coordinate axis; converting the corrected first unit spherical coordinates after being rotated in the reverse direction to 2D fish-eye coordinates can also be implemented.

The present invention is not limited to the specifically disclosed embodiments, and variations and modifications may be made without departing from the scope of the present invention.

That is, it should be understood that the methods and apparatuses disclosed in some embodiments provided by the present invention can be implemented in other forms. For example, the embodiments of the above described apparatus are only schematic examples. For example, the classification of the units are merely logical functional classification, and another classification method may be employed in an actual implementation. For example, multiple units or elements may be combined, or included in another system, or some functions may be omitted or not performed. Additionally, the interconnections or direct or communicable connections indicated or disclosed above may be those implemented via interfaces, and the indirect or communicable connections between devices or units may be electrical or mechanical or by other forms of connections.

Also, various functional units in each embodiment of the invention may be collected into a single process unit, each unit may physically exist alone, or two or more units may be collected into a single unit. The collected unit may be implemented in the form of hardware or may be implemented in the form of hardware plus a software functional unit.

The collected unit implemented in the form of the software functional unit can be stored in a computer readable recording medium. The software functional unit may be stored in a recording medium and includes some instructions that cause a computer device (which may be a personal computer, server, or network facility, for example) to perform some of the steps of the method described in each embodiment of the present application. The recording medium may be any one of a variety of media capable of storing program code, such as a USB memory, removable disk, ROM, RAM, magnetic disk, and optical disk.

The present application is based on and claims priority to Chinese priority application No. 201910671812.1 filed on Jul. 24, 2019, the entire contents of which are hereby incorporated herein by reference.

What is claimed is:

1. A method for correcting a rolling shutter phenomenon, the method comprising:
   obtaining a double fish-eye image to be processed from frame images generated by a photographing device;
   obtaining an image processing parameter including gyro data of the photographing device;
   calculating a rolling shutter phenomenon correcting parameter based on the image processing parameter by calculating a target rolling shutter phenomenon rotation angle with respect to each scan line of the frame images based on at least the target gyro data; and
   correcting the rolling shutter phenomenon with respect to the double fish-eye image in a spherical-coordinate system using the target rolling shutter phenomenon rotation angle.

2. The method according to claim 1, wherein
   the image processing parameter further includes a time stamp of each of the frame images generated by the photographing device, a rolling shutter phenomenon time with respect to the photographing device, a width and a height of a single fish-eye image, and an aperture value of the photographing device.

3. The method according to claim 2, wherein the calculating a rolling shutter phenomenon correcting parameter based on the image processing parameter comprises:
   obtaining a time of an exposure center with respect to each of the frame images based on the time stamp of the frame images generated by the photographing device;
   determining a start time of the rolling shutter phenomenon with respect to the frame images;
   determining a time of occurrence of the rolling shutter phenomenon with respect to each scan line with respect to the frame images based on the time at the exposure center with respect to the frame images and the start time of the rolling shutter phenomenon;
   determining target gyro data corresponding to the scan line based on the gyro data of the photographing device, the time at the exposure center with respect to the frame images, and the time of occurrence of the rolling shutter phenomenon with respect to the scan line; and
   calculating the target rolling shutter phenomenon rotation angle with respect to the scan line based on the target gyro data, the time at the exposure center with respect to the frame images, and the time of occurrence of the rolling shutter phenomenon with respect to the scan line.

4. The method according to claim 3, wherein
   the determining the start time of the rolling shutter phenomenon with respect to the frame images includes determining the start time of the rolling shutter phenomenon with respect to the frame images by the following equation:

$$RST_{start} = ECT - rst/2$$

where $RST_{start}$ denotes the start time of the rolling shutter phenomenon with respect to the frame images, ECT denotes the time at the exposure center with respect to the frame images, and rst denotes the rolling shutter phenomenon time with respect to the photographing device.

5. The method according to claim 3, wherein
   the determining the time of occurrence of the rolling shutter phenomenon with respect to each scan line with respect to the frame images based on the time at the exposure center and the start time of the rolling shutter phenomenon with respect to the frame images includes determining the time of occurrence of the rolling shutter phenomenon with respect to each scan line with respect to the frame images by the following equation:

$$rst_{row\_i} = RST_{start} + rst \times \frac{row\_i}{h}$$

where $rst_{row\_i}$ denotes the time of occurrence of the rolling shutter phenomenon with respect to each scan line with respect to the frame images, $RST_{start}$ denotes the start time of the rolling shutter phenomenon with respect to the frame images, rst denotes the rolling shutter phenomenon time with respect to the photographing device, row_i denotes an i-th scan line of the frame images, and h denotes the total number of scan lines of the frame images.

6. The method according to claim 3, wherein
   the calculating the target rolling shutter phenomenon rotation angle with respect to the scan line based on the target gyro data, the time at the exposure center with respect to the frame images, and the time of occurrence of the rolling shutter phenomenon with respect to the scan line includes:
   sectioning a target period into at least two subperiods using the target gyro data, a length of the target period being determined by the time of occurrence of the rolling shutter phenomenon with respect to the scan line with respect to the frame images, and the time at the exposure center with respect to the frame images;
   multiplying lengths of the at least two subperiods by first gyro data corresponding to the at least two subperiods, respectively, to obtain at least two products, the first gyro data being data in the target gyro data or reference gyro data; and
   adding the products together to obtain the target rolling shutter phenomenon rotation angle with respect to the scan line.

7. The method according to claim 6 comprising:
   after the adding the products together to obtain the target rolling shutter phenomenon rotation angle with respect to the scan line, further, obtaining a correcting reference parameter including information of a lens to be corrected and a correcting direction; and determining a final target rolling shutter phenomenon rotation angle corresponding to the target rolling shutter phenomenon rotation angle based on correspondence relationships between the information of the lens to be corrected; the correcting direction; and the target rolling shutter phenomenon rotation angle.

8. The method according to claim 7, wherein the correcting the rolling shutter phenomenon with respect to the double fish-eye image in a spherical-coordinate system using the rolling shutter phenomenon correcting parameter includes:

obtaining the final target rolling shutter phenomenon rotation angle with respect to each scan line with respect to an i-th frame image;

converting the final target rolling shutter phenomenon rotation angle into a rotation matrix;

cutting the double fish-eye image into single fish-eye images and converting target single fish-eye images into unit spherical coordinates based on the aperture value of the photographing device to obtain unit spherical coordinates of the target single fish-eye images, which are single frame images from among the single fish-eye images;

multiplying the unit spherical coordinates by the rotation matrix to obtain corrected unit spherical coordinates;

converting the corrected unit spherical coordinates to 2D fish-eye coordinates;

generating corrected target single fish-eye images using the 2D fish-eye coordinates; and obtaining a corrected double fish-eye image using the corrected target single fish-eye images.

9. The method according to claim 8 comprising:

after the cutting the double fish-eye image into single fish-eye images and converting target single fish-eye images into unit spherical coordinates to obtain unit spherical coordinates of the target single fish-eye images, further, rotating the unit spherical coordinates by a first angle along a first coordinate axis to obtain first unit spherical coordinates; and multiplying the unit spherical coordinates by the rotation matrix to obtain corrected unit spherical coordinates, wherein the multiplying includes multiplying the first unit spherical coordinates by the rotation matrix to obtain corrected first unit spherical coordinates; and after the multiplying the first unit spherical coordinates by the rotation matrix to obtain corrected first unit spherical coordinates, further, rotating in a reverse direction the corrected first unit spherical coordinates by the first angle along the first coordinate axis; and converting the corrected unit spherical coordinates to 2D fish-eye coordinates, wherein the converting includes converting the corrected first unit spherical coordinates, which have been rotated in the reverse direction, to 2D fish-eye coordinates.

10. The method according to claim 1, wherein the correcting corrects the rolling shutter phenomenon with respect to the double fish-eye image in the spherical-coordinate system using the target rolling shutter phenomenon rotation angle by performing rotation of a three-dimensional unit sphere image in a three-dimensional space and converting the rotated three-dimensional unit sphere image back to a two-dimensional double fish-eye image.

11. A rolling shutter phenomenon correcting apparatus comprising:

a processor configured to:

obtain a double fish-eye image to be processed from frame images generated by a photographing device;

obtain an image processing parameter including gyro data of the photographing device;

calculate a rolling shutter phenomenon correcting parameter based on the image processing parameter by calculating a target rolling shutter phenomenon rotation angle with respect to each scan line of the frame images based on at least the target gyro data; and correct the rolling shutter phenomenon with respect to the double fish-eye image in a spherical-coordinate system using the target rolling shutter phenomenon rotation angle.

12. The rolling shutter phenomenon correcting apparatus according to claim 11, wherein the image processing parameter further includes a time stamp of each of the frame images generated by the photographing device, a rolling shutter phenomenon time with respect to the photographing device, a width and a height of a single fish-eye image, and an aperture value of the photographing device.

13. The rolling shutter phenomenon correcting apparatus according to claim 12, wherein the calculating the rolling shutter phenomenon correcting parameter based on the image processing parameter comprises:

obtaining a time of an exposure center with respect to each of the frame images based on the time stamp of the frame images generated by the photographing device;

determining a start time of the rolling shutter phenomenon with respect to the frame images;

determining a time of occurrence of the rolling shutter phenomenon with respect to each scan line with respect to the frame images based on the time at the exposure center and the start time of the rolling shutter phenomenon with respect to the frame images;

determining target gyro data corresponding to each scan line based on the gyro data of the photographing device, the time at the exposure center with respect to the frame images, and the time of occurrence of the rolling shutter phenomenon with respect to the scan line; and calculating the target rolling shutter phenomenon rotation angle with respect to the scan line based on the target gyro data, the time at the exposure center with respect to the frame images, and the rolling shutter phenomenon time with respect to the scan line.

14. The rolling shutter phenomenon correcting apparatus according to claim 13, wherein the determining the start time of the rolling shutter phenomenon with respect to the frame images includes determining the start time of the rolling shutter phenomenon with respect to the frame images by the following equation:

$$RST_{start} = ECT - rst/2$$

where $RST_{start}$ denotes the start time of the rolling shutter phenomenon with respect to the frame images, ECT denotes the time at the exposure center with respect to the frame images, and rst denotes the rolling shutter phenomenon time with respect to the photographing device.

15. The rolling shutter phenomenon correcting apparatus according to claim 13, wherein
the determining the time of occurrence of the rolling shutter phenomenon with respect to each scan line with respect to the frame images based on the time at the exposure center and the start time of the rolling shutter phenomenon with respect to the frame images includes determining the time of occurrence of the rolling shutter phenomenon with respect to each scan line with respect to the frame images by the following equation:

$$rst_{row\_i} = RST_{start} + rst \times \frac{row\_i}{h}$$

where $rst_{row\_i}$ denotes the time of occurrence of the rolling shutter phenomenon with respect to each scan line with respect to the frame images, $RST_{start}$ denotes the start time of the rolling shutter phenomenon with respect to the frame images, rst denotes the rolling shutter phenomenon time with respect to the photographing device, row_i denotes an i-th scan line of the frame images, and h denotes the total number of scan lines of the frame images.

16. The rolling shutter phenomenon correcting apparatus according to claim 13, wherein
the calculating the target rolling shutter phenomenon rotation angle with respect to the scan line based on the target gyro data, the time at the exposure center with respect to the frame images, and the time of occurrence of the rolling shutter phenomenon with respect to the scan line includes:
sectioning a target period into at least two subperiods using the target gyro data, a length of the target period being determined by the time of occurrence of the rolling shutter occurrence with respect to the scan line with respect to the frame images, and the time at the exposure center with respect to the frame images;
multiplying lengths of the at least two subperiods by first gyro data corresponding to the at least two subperiods, respectively, to obtain at least two products, the first gyro data being data in the target gyro data or reference gyro data; and
adding the products together to obtain the target rolling shutter phenomenon rotation angle with respect to the scan line.

17. The rolling shutter phenomenon correcting apparatus according to claim 16, wherein the processor is configured to, after the adding the products together to obtain the target rolling shutter phenomenon rotation angle with respect to the scan line:
further, obtain a correcting reference parameter including information of a lens to be corrected and a correcting direction; and
determine a final target rolling shutter phenomenon rotation angle corresponding to the target rolling shutter phenomenon rotation angle based on correspondence relationships between the information of the lens to be corrected; the correcting direction; and the target rolling shutter phenomenon rotation angle.

18. The rolling shutter phenomenon correcting apparatus according to claim 17, wherein
the correcting the rolling shutter phenomenon with respect to the double fish-eye image in a spherical-coordinate system using the rolling shutter phenomenon correcting parameter includes:

obtaining the final target rolling shutter phenomenon rotation angle with respect to each scan line with respect to an i-th frame image;
converting the final target rolling shutter phenomenon rotation angle into a rotation matrix;
cutting the double fish-eye image into single fish-eye images and converting target single fish-eye images into unit spherical coordinates based on the aperture value of the photographing device to obtain unit spherical coordinates of the target single fish-eye images, which are single frame images from among the single fish-eye images;
multiplying the unit spherical coordinates by the rotation matrix to obtain corrected unit spherical coordinates;
converting the corrected unit spherical coordinates to 2D fish-eye coordinates;
generating corrected target single fish-eye images using the 2D fish-eye coordinates; and
obtaining a corrected double fish-eye image using the corrected target single fish-eye images.

19. The rolling shutter phenomenon correcting apparatus according to claim 18, wherein
the processor is configured to
after the cutting the double fish-eye image into single fish-eye images and converting target single fish-eye images into unit spherical coordinates to obtain unit spherical coordinates of the target single fish-eye images,
further, rotate the unit spherical coordinates by a first angle along a first coordinate axis to obtain first unit spherical coordinates; and
multiply the unit spherical coordinates by the rotation matrix to obtain corrected unit spherical coordinates, wherein the multiplying includes multiplying the first unit spherical coordinates by the rotation matrix to obtain corrected first unit spherical coordinates; and
after the multiplying the first unit spherical coordinates by the rotation matrix to obtain corrected first unit spherical coordinates,
further, rotate in a reverse direction the corrected first unit spherical coordinates by the first angle along the first coordinate axis; and
convert the corrected unit spherical coordinates to 2D fish-eye coordinates, wherein the converting includes converting the corrected first unit spherical coordinates, which have been rotated in the reverse direction, to 2D fish-eye coordinates.

20. A non-transitory computer-readable recording medium storing a computer program which, when executed by a processor, causes the processor to perform a method for correcting a rolling shutter phenomenon, the method comprising:
obtaining a double fish-eye image to be processed from frame images generated by a photographing device;
obtaining an image processing parameter including gyro data of the photographing device;
calculating a rolling shutter phenomenon correcting parameter based on the image processing parameter by calculating a target rolling shutter phenomenon rotation angle with respect to each scan line of the frame images based on at least the target gyro data; and
correcting the rolling shutter phenomenon with respect to the double fish-eye image in a spherical-coordinate system using the target rolling shutter phenomenon rotation angle.

* * * * *